Figure 1:
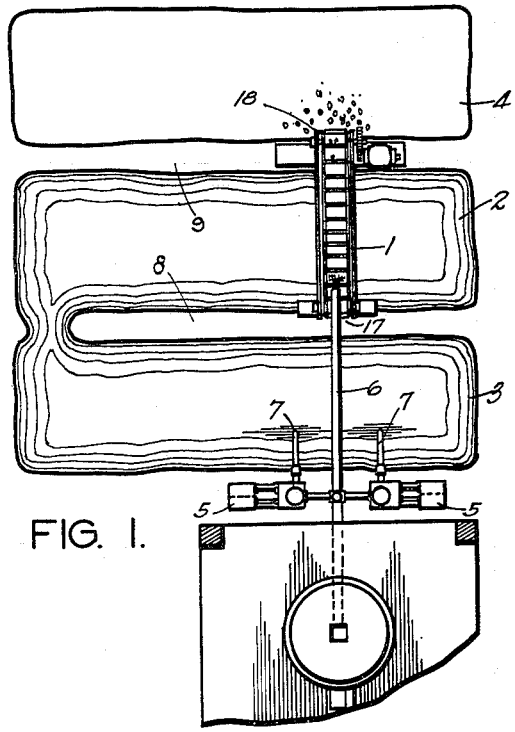

April 7, 1931. H. BRAUER ET AL 1,800,168

WELL DRILLING FLUID SEPARATING DEVICE

Filed Sept. 13, 1928

INVENTORS
Herman Brauer,
BY Charles R. Frail
Loyal J. Miller
ATTORNEY

UNITED STATES PATENT OFFICE

HERMAN BRAUER AND CHARLES R. TRAIL, OF SEMINOLE, OKLAHOMA

WELL-DRILLING FLUID-SEPARATING DEVICE

Application filed September 13, 1928. Serial No. 305,771.

Our invention relates to improvements in devices for separating the shale, sand, rock, gravel, grit and the like from well drilling fluid, commonly called mud.

The objects of our invention are to provide a device of this character which will be new, novel, practical, useful and of utility; to provide a device which will quickly and positively remove the shale, sand, rock; and other particles of earth formation which does not dissolve in water, oil, gas or well drilling fluid, commonly called mud; to provide a device which will obviate the necessity of digging and maintaining so many and such large settling pits as are now used in the series; to provide means for better controlling the quality of drilling fluid or mud in a smaller settling pit; to conserve said drilling fluid by removing practically all of said fluid which ordinarily adheres to said particles being removed therefrom; that will improve the fluid commonly called mud for use in sealing the sides of the hole by eliminating the foreign elements which are liable to be scraped off the sides and break the coating intended to seal the hole tight.

In the rotary drilling method a heavy fluid or mud is used to case or wall up the wall or sides of the hole or well as it is drilled in order to prevent it from caving in, or sloughing off. This fluid, or mud, is composed usually of the formation that is being drilled, mixed with water from the slush pits, circulated to the bottom of the hole, or well by means of a pump, commonly called a slush pump. In the drilling of the well there is encountered a number of various formations that do not dissolve in the water that is being circulated and therefore is not suitable for the making, or mixing of mud that will stick together and wall up, or case the hole, or well. It is therefore necessary to separate these particles of shale, sand, rock and the like from the drilling fluid.

The present method of doing this is to dig a series of pits in the ground and let the drilling fluid flow into one of them and then let it flow by gravity to the other pits and finally flow into the pit in which is located the suction pipes of the slush pumps. This circulation, or flow of the drilling fluid in the pits allows the shale, sand, rock and other particles of earth formation that will not dissolve to settle to the bottom of the pits by gravity. It is then either forced out of the pits by means of steam jets, or raked, or shoveled out by the men working on the drilling rig.

This slow gravity settling and circulation of the drilling fluid and removal of the shale and other particles entails large pits, much labor and expense and loss of water by evaporation all of which is eliminated in our improved device.

Figure 4:
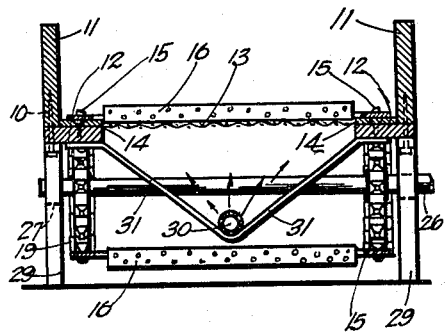
Figure 2:
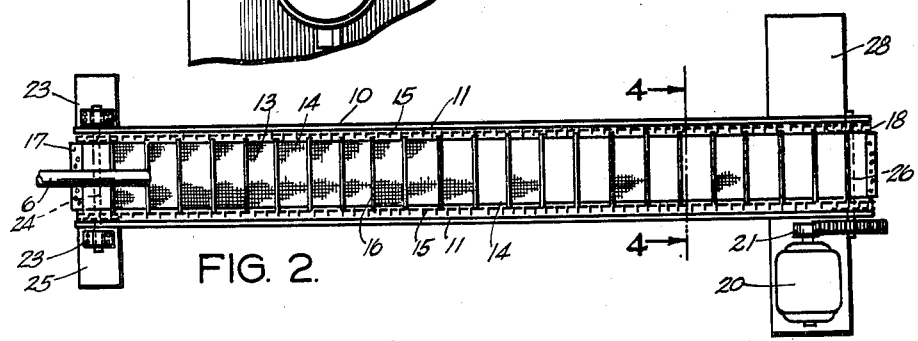
Figure 3:
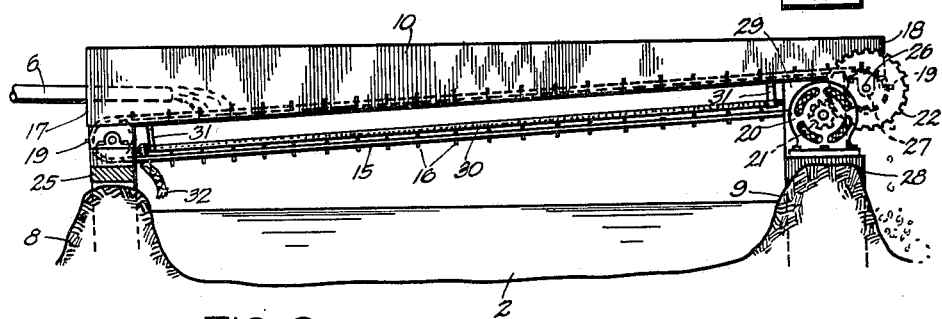

With these and other objects in view as will more fully appear our invention consists in the construction, novel features, and combination of parts hereinafter more fully described, pointed out in the claims hereto appended, and illustrated in the accompanying one-sheet drawing, of which, Figure 1 is a plan view of the device in relation to the slush pits and derrick floor; Fig. 2 is a plan view of the drilling fluid separating device; Fig. 3 is an elevational view of Fig. 2; and Fig. 4 is a sectional view on the lines 4—4 of Fig. 2.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof, and that the drawings are to be interpreted as being illustrative and not restrictive.

One embodiment of our invention is shown as follows: Our separating device 1 is placed to span the width of settling pit 2 as can best be seen in Fig. 1. The said pit 2 is in gravity flow communication with suction pit 3, reserve pit 4 provides a receptacle for the screened-out shale, rocks and the like. The slush pumps 5 are placed adjacent the derrick floor, said suction pit 3, and discharge pipe 6 which carries the drilling fluid and waste from the well to device 1; suction pipes 7 return said fluid or mud, after being freed of its undesirable waste products, to the well to be used again. The supports for the ends of device 1 are placed on levels 8 and 9 between said pits. The conveyor trough 10, which may be of any desired dimension, consists of the vertical side boards 11 secured to bottom boards 12, the mesh screen 13 is supported by boards 12 and held securely thereto by strap iron tracks 14 over which endless conveyor chains 15 are adapted to slide. To the said chains 15 we attach a plurality of properly spaced perforated steel blade scrapers 16 by any suitable means. As can best be seen in Fig. 3 the bottom of conveyor trough 10, and tracks 14 for endless conveyor chains 15, are slightly inclined, the low end being at 17 where discharge pipe 6 empties and the high end at 18 where the waste is dumped into pit 4. This arrangement assists in more quickly screening through the desirable drilling fluid or mud which will not flow up said incline while the said steel scrapers 16 will scrape the shale and other solid waste particles off of the screen 13 and out of said trough 10 at 18. By the time said particles have reached point 18 they will have been tumbled and rolled over said screen 13 until they are almost entirely freed of mud which will pass through screen 13 and down into pit 2. Sprockets 19 at points 17 and 18 serve to direct endless conveyor chains 15 over tracks 14. Motor 20, preferably located at end 18 away from the splash from pipe 6, having drive sprockets 21 drives the said conveyor chains 15 through driven sprocket 22 and on drive shaft 26. Bearings 23 at point 17 for sprocket shaft 24 are bolted to any suitable base supported by levee 8. Bearings 27 for shaft 26 are attached to the underside of bottom board 12 at end 18. The base 28 for motor 20 is placed on levee 9 and supports for said end 18 rest on said base 28. A steam jet pipe 30 as can best be seen in Figs. 3 and 4 is placed centrally under screen 13 and has a series of rows of perforations which direct jets of steam upward against the under side of said screen 13 to automatically clean the screen of particles which might obstruct the flow of fluid therethrough. The pipe 30 is secured to member 12 by support 31 and has a steam hose 32 connected to one end of said pipe 30 for admitting steam therein.

The waste laden fluid from pipe 6 pours out over screen 13 adjacent end 17. The thin watery part of said fluid will pass immediately through the screen while the thicker mud will be carried up the incline of the screen along with the shale, rock and other particles by the scrapers 16. The said particles will be tumbled and rolled over the said screens and this action will not only free said particles of mud but will assist the mud in passing through the screen. In the course of time the finer of said particles will tend to choke up the screen but the said screen can be instantly cleaned by means of the steam jets issuing from pipe 30. The accumulation of shale, rock and the like in pit 4 at the end 18 of trough 10 can be disposed of in the usual manner of removing the same.

Having thus described our invention what is claimed and desired to be secured by Letters Patent, is:

1. In a device of the class described, the combination with means for supplying slush, a settling pit for receiving slush, a connecting suction pit for drawing off said slush for use, and a conveyor trough having a screen in its upwardly inclined bottom, said trough disposed across said settling pit, of a separate reserve pit, and endless chain conveyor for conveying foreign materials from said slush, means for driving said conveyor, and blade scrapers with perforations therein fastened to said chain conveyor for separating said foreign materials from the slush and to carry them upward on said screen and deposit them in said reserve pit away from said slush.

2. In a device of the class described, the combination with means for supplying slush, a settling pit for receiving slush for use, a conveyor trough having a screen in its upwardly inclined bottom, said trough disposed across said settling pit, of a separate reserve pit, an endless chain conveyor for conveying foreign material from said slush, means for driving said conveyor, blade scrapers with perforations therein fastened to said conveyor chains said scrapers adapted for separating said foreign material from the slush and for carrying it upward on said screen and depositing it in said reserve pit, and perforated steam pipe means disposed under said screen for cleaning its mesh.

3. The combination with a settling pit, a conveyor trough having a mesh screen bottom, said trough slightly inclined upwardly across said settling pit, and means for supplying slush to said trough, of a reserve pit adjacent to and separate from said settling pit, an endless chain conveyor operably disposed within said trough, perforated blade scrapers fastened on said conveyor, and means for driving said conveyor, said trough adapted to deliver said slush through said bottom to said settling pit, said conveyor adapted to deliver any material foreign to said slush into said reserve pit.

4. A device, as described, as and for the purposes stated, having in combination, a settling pit, a suction pit connected therewith, a separate reserve pit, an inclined trough disposed across said settling pit and reaching slightly above said reserve pit, a screen bottom for said trough, an endless chain conveyor operably disposed in said trough, perforated blade scrapers carried by said chain, said scrapers extending laterally across said conveyor, and adapted to travel upward with said chain and contact said bottom for separating extrinsic materials from slush and discharging them in said reserve pit, means for supplying slush to the lower end of said trough, and means for driving said conveyor.

5. Organization as described in claim 4 and, perforated steam pipe means disposed under said screen for cleaning its mesh.

HERMAN BRAUER.
CHARLES R. TRAIL.